April 12, 1955 R. J. RAWSON 2,706,242
NOISE CONTROL IN COMBINED RADIO TRANSMITTING AND RECEIVING APPARATUS
Filed Aug. 7, 1952
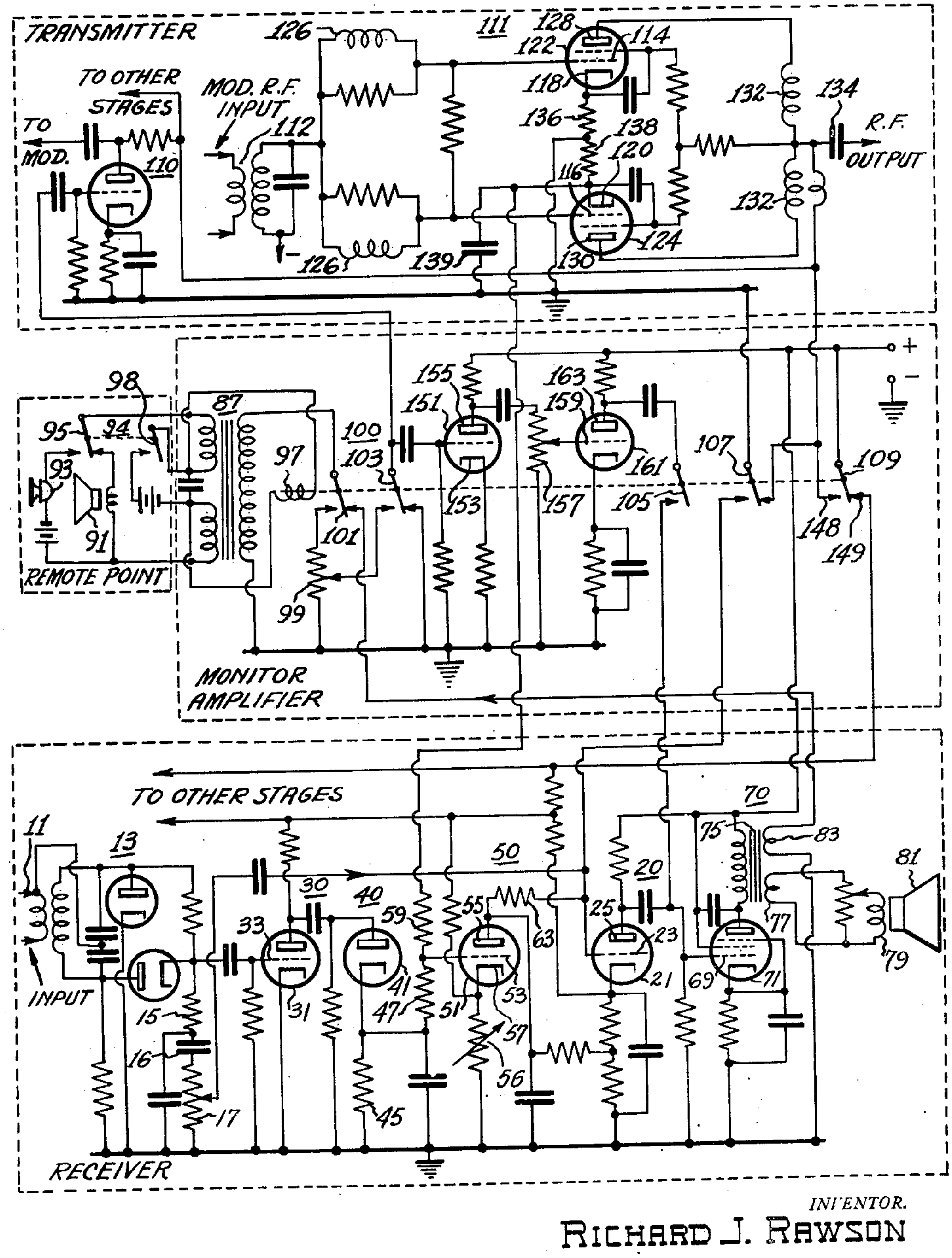
INVENTOR.
RICHARD J. RAWSON
BY Charles H. Brown
ATTORNEY United States Patent Office 2,706,242
Patented Apr. 12, 1955

2,706,242

NOISE CONTROL IN COMBINED RADIO TRANSMITTING AND RECEIVING APPARATUS

Richard Jules Rawson, Haddonfield, N. J., assignor to Radio Corporation of America, a corporation of Delaware Application August 7, 1952, Serial No. 303,051

14 Claims. (Cl. 250—13)

This invention relates to duplex radio transmission apparatus, and it particularly pertains to circuitry for eliminating undesirable noise from receiving apparatus during the period between operation of transmitting apparatus and the receiving apparatus in a half-duplex radio communication system.

Half-duplex radio communication systems are widely used for establishing two-way communications between two, or more, points but where simultaneous communication in both directions is not required. Examples of such communications systems are to be found in police and fire department radio systems, railroad intercommunication systems, airline control networks, citizens' radio services and the like.

In these radio communication systems, it is highly desirable to employ a common power supply for both the receiver and the transmitter. Various circuit arrangements for supplying power to these equipments are known. The most popular arrangement is of the type where a medium voltage anode supply is switched between the receiver and the lower power stages of the transmitter, the high power stages of the transmitter being automatically energized when the switching operation energizes the lower power stages of the transmitter. In such an arrangement, the receiver is ineffective when the transmitter is energized. When the transmitter is deenergized and the receiver energized in reversing the direction of communication, annoying clicks, blurps, acoustical and radio frquency feedback from the transmitter to the receiver occur for a short period of time. Undesirable blooping effects are especially prevalent where the transmitter and receiver are tuned to the same frequency or to very closely related frequencies as is so often desired.

Various means have been suggested to correct this situation. One such means is described in a copending U. S. patent application of N. S. Parks, Serial No. 193,137, filed October 31, 1950, now U. S. Patent No. 2,657,304, dated October 27, 1953. In the arrangement of this Parks patent, the desired result is attained by deriving a direct potential in the transmitter portion of the arrangement and applying it to the audio frequency amplifying stages of the receiver portion in such a manner as to block the receiver during periods of operation of the transmitter. A simple delay or filter arrangement is interposed in the leads to cause the receiver activation to be delayed a short period of time after the transmitter is disabled to prevent residual magnetic field effects of the transmitter from developing undesired voltages at the output of the receiver.

Such an arrangement, while excellent for the purpose for which it was intended, is disadvantageous for a number of practical applications. Such an arrangement prevents any portion of the receiver circuit beyond the blocked audio tube from being used in any way for other purposes, such as for a transmission monitor or the like.

It is an object of the invention to eliminate the transient noise condition appearing during the send-to-receive switching periods in the speaker of a transmitter-receiver combination utilizing a common power supply.

It is another object of the invention to eliminate transient noise from the speaker of a transmitter-receiver combination utilizing a common power supply during switching periods while still permitting the receiver circuits to function in the normal manner for monitor purposes and the like.

It is a further object of the invention to provide an improved circuit in accordance with the foregoing objects which is inexpensive, simple and compact.

It is still another object to provide an improved circuit arrangement in accordance with the foregoing objects which may be added to existing receiver and transmitter combination installations without undue complication and expense.

It is still a further object of the invention to provide an improved circuit arrangement in accordance with the foregoing objects which does not require critical adjustment.

The objects of the invention are attained in a transmitter-receiver combination operated from a common power supply by deriving a positive voltage from the transmitter section and applying the derived voltage to the control element of a squelch circuit in the receiver. A positive voltage, which is obtained from the bias supply at the cathode of a power amplifier tube of the transmitter when the transmitter is energized, is applied through a very high resistance element to the control grid of a squelch tube which control grid is normally connected to ground through a high resistance element and a capacitor connected in parallel. At the instant of switching from the transmitting condition to the receiving condition, a positive voltage appears on the squelch control grid through the voltage divider thus formed and is held there for a time interval determined by the time constant of the by-pass capacitor of the transmitter power amplifier and high resistance element in combination. Thus the undesirable transient noise is blocked out without disabling the receiver. The invention is concerned with eliminating the transient noise which specifically appears when switching from the transmitting condition to the receiving condition as a result of the squelch control circuit failing to act immediately.

The invention is described in greater detail below with reference to the accompanying drawing forming part of the specification and in which the sole figure is a schematic diagram illustrating only those circuit components of a transmitter-receiver combination essential for an understanding of the invention.

The drawing schematically shows an arrangement of equipment for a fixed station serving as the master control station of a police radio or taxicab communications system by way of example. A radio frequency wave receiver, an audio wave monitor amplifier and a radio frequency wave transmitter are located at one point near the associated antenna system (not shown) and communications control apparatus is located at a remote point. The receiver shown, which is of the frequency modulation type, as an example only, contains a discriminator type detector stage 13, an audio frequency amplifier stage 20 coupled to the detector stage 13, a "noise" amplifier stage 30, a "noise" rectifier stage 40 and a "squelch control" stage 50 coupled between the detector stage 13 and the audio amplifier stage 20 to block the latter in the absence of a received carrier wave of given intensity or greater. The input circuit of an audio output stage 70 is coupled to the output circuit of the amplifier stage 20 and is also coupled to the output of the monitor amplifier selectively by means of an operating relay 97. The output of stage 70 is connected to a reproducer 91 through a switching element 101 of the operating relay 97 so that signals received can be heard at the remote control point. A microphone 93 may, by operating a switch 94, which in turn operates the relay 97, be connected to the input of the monitor amplifier through another switching element 103. The output of the monitor amplifier is connected by a further switching element 105 to the input circuit of the power amplifier stage 70 of the receiver so that the receiver technician may monitor the signals over the loudspeaker 81 which also serves to monitor the signals obtained by the receiver. The signals from the microphone 93 are also applied through the switching element 103 to the input amplifier stage 110 of the modulator portion (not shown) of the transmitter. After the modulation process is complete, modulated radio frequency energy is applied to a transmitter power amplifier stage 111 and the output transferred to an antenna (not shown) either directly or by way of further power amplifier stages.

In the details of the arrangement shown in the drawing, received radio frequency energy is applied to the input winding 11 of the detector circuit 13 of the receiver (shown only in part) and an audio frequency wave is derived from the detector output resistor 15. This audio frequency (A. F.) wave is then applied by way of a capacitor 16 and a gain control potentiometer 17 to the grid element 23 of an A. F. amplifier tube 21 forming part of an audio amplifier stage 20. The same audio frequency wave is also applied to the grid element 33 of a "noise amplifier" tube 31 and from the anode of this tube to a "noise rectifier" 41.

The output of the "noise rectifier" 41 appears across the output resistor 45 and is applied by way of a coupling resistor 47 to the grid 53 of a squelch tube 51. The anode 55 of the squelch tube 51 is coupled to the grid 23 of the audio amplifier tube 21 by a resistor 63. The output voltage wave across the output resistor 45 is of the same character as the usual automatic gain control voltage in amplitude modulation receivers. Indeed, in the application of the invention to such receivers the automatic gain control line is used to obtain a source of waveform which is differentiated to give sharp response to high amplitude, short duration, pulses which are recognized as "noise." Thus in either case when a carrier wave is being received, the large control voltage developed will bias the tube 51 to render it inoperative to block the amplifier tube 21. The output of audio frequency amplifier stage 20 is taken from the anode electrode 25 of the voltage amplifier tube 21, amplified by a power pentode tube 71, and applied by way of an audio frequency output transformer 75 having one secondary winding 77 connected to the voice coil 79 of a dynamic loudspeaker 81 and another secondary winding 83 connected by a transformer 87 in the input circuit of a monitor amplifier to a speaker 91. Speaker 91 may be replaced by any form of acoustical transducer such as a pair of earphones or the receiver of a telephone type handset or the like. Both the technician at the transmitter-receiver location and the operator at the remote point can listen to all of the signals being received.

The operator at the remote point may transmit a message by pressing a push-to-talk switch 94 which has one arm 95 for disconnecting the speaker 91 and connecting a microphone 93 to the transformer 87. Microphone 93 may be replaced by another form of acoustical transducer such as a handset transmitter or the like. The switches 94 and 101–109 are shown in the drawing in the signal receiving condition. When switch 94 is pressed, another arm 98 applies direct current to the winding 97 of the push-to-talk relay 100 having a plurality of switch sections 101–109. When receiving signals, the secondary winding 83 is connected to the transformer 87 of the monitor by the back contacts of the switch section 101. Operating potential for stages 30, 50 and other stages is applied through the back contacts of the switch section 109. When transmitting signals, the output of the microphone 93 is applied to a modulation level control 99 through the switch section 101 and a monitor amplifier input switch section 103 is also thrown to apply the microphone output to the input of the monitor amplifier and to the input audio amplifier 110 of the modulation stages of the transmitter simultaneously.

Modulated radio frequency energy obtained from the frequency controlling and modulation stages (not shown) is applied to the input circuit of a radio frequency vacuum tube amplifier stage 111 by means of a transformer 112. The frequency controlling and modulation stages may be of any known type either frequency modulation, amplitude modulation or any other type and are not a part of the invention in and of itself or even necessary to a complete understanding of the invention. The transformer 112 is connected between the grid elements 114 and 116 and the cathode elements 118 and 120 of vacuum tubes 122 and 124 through the intermediary of chokes 126. Radio frequency output is obtained from the anode electrodes 128 and 130 and is coupled to further amplifier stages (not shown) by way of the output chokes 132 and a capacitor 134. Anode and screen grid potentials are applied to amplifier 111 by means of front contacts 148 of the switch section 109 of the press-to-talk relay. Upon arm 109 being thrown to the front contact 148, the transmitter R. F. amplifier

111, modulation input amplifier 110 and other stages are energized, and self-bias for the amplifier tubes 122 and 124 is developed across the bias resistors 136 and 138 due to cathode-anode current flow through the power amplifier tubes 122 and 124.

The switch section 103 also couples the output of the microphone 93 to the grid 151 of the monitor amplifier input tube 153. The anode 155 is coupled by a level setting potentiometer 157 to the grid 159 of the output amplifier tube 161. The anode 163 of the output tube 161 is connected by the switch section 105 to the control grid 69 of the pentode tube 71 so that the input to the transmitter portion may be monitored in the receiver loudspeaker 81. The tubes 21, 71, 151 and 161 are energized at all times. The pentode tube 71 either amplifies the received signals or the signal modulating the transmitter. The switch section 107 grounds the anode circuit of all of the lower power transmitter stages when receiving and the grid 23 of the amplifier tube 21 when transmitting. This prevents blooping of the receiver due to residual energy in the transmitter when receiving or interference from incoming signals when monitoring the transmission.

When the receiver is operating normally, about 6 volts of positive D. C. voltage obtained from the receiver noise rectifier tube 41 appears on the grid 53 of the squelch control tube 51 which then operates to prevent unwanted noise from going through the audio amplifier tube 21 and into the speaker 81, when the squelch control 56 is properly set. When switching from the sending condition to the receiving condition, the B+ supply is switched from the transmitter to the receiver. There is an interval between this switching process and the time when sufficient positive voltage from the noise rectifier tube 41 appears on the grid 53 of the squelch control tube 51. Until this positive voltage appears on the grid 53, the squelch control tube 51 cannot block the amplifier tube 21 and thus the noise gets into the speaker 81.

If the squelch control could act immediately to block out the noise when switching from the transmitting condition to the receiving condition, a positive voltage from the receiver noise rectifier 41 would immediately appear on the squelch control grid 53. As this voltage fails to appear immediately, a portion of the bias current obtained across the resistor 138 in the transmitter is applied by way of a coupling resistor 59 to the grid resistor 47 in the receiver, the upper end of which is connected to the grid element 53 of squelch tube 51. The required positive voltage from the transmitter is held there during the critical time increment by taking a rather high initial potential stored in the capacitor 139, which drops off in value as energy is consumed. The time constant of the network comprising the resistor 59 and the capacitor 139 provides for an extended application of bias potential on the order of 1/10 of a second, which period affords sufficient enabling of the squelch circuit to prevent annoying speaker disturbances but is sufficiently short to prevent loss of the initial part of any intelligence to be received.

The push-to-talk control circuit shown and described is given by way of example only as it alone forms no part of the invention. Any known means for operating the relay 97 from a distant point may be used to advantage. Also it is common practice to use several separate relays in more or less cascade connection from such push-to-talk functions. For example, the switch section 109 might be located in the power supply portion of the apparatus and the switch section 107 in the transmitter portion and so on.

It should be understood that the circuit arrangement according to the invention is by no means limited to that hereinbefore described, but can be applied in a number of ways, either in the design of new equipment or by addition to existing equipment. For example, existing equipment having conventional switching means, which produces annoying speaker disturbances, may be modified according to the invention in an exceedingly simple manner. The higher end of the grid resistor of the squelch tube, which is usually connected directly to ground at the other end, is connected through a resistor to a source of positive potential in one of the transmitter stages. The bypass capacitor normally connected across the bias resistor may supply the whole or only a part of the required capacity as desired. Additional capacity may be had by paralleling the bypass capacitor with another capacitor. If the added capacitor is large, it may be necessary or at least desirable to add a like capacitor to the other tube of push-pull or push-push stages. The resistor-capacitor combination should have a time constant of the order of 1/20 to 1/5 of a second, so that resistor values between 500,000 ohms and 10 megohms and capacitor values between 0.1 and 0.15 microfarad will be satisfactory. Thirty to 60 volts positive with respect to ground, depending upon the squelch tube to be enabled, are required but practically every transmitter has one or more sources of potential of this magnitude. The bias resistor may be tapped to obtain the proper value of voltage, if desired. The drain will be very slight, so that the transmitter stages will not seriously be affected. In somewhat similar manner, a negative enabling potential may be supplied to the cathode of the squelch tube if desired, instead of applying a positive enabling potential to the control grid.

In a 30–50 mc./s. FM master control communications receiver-transmitter combination embodying the invention and successfully tried out in practice, 60 volts was obtained from the third frequency modulated carrier frequency tripler stage of the transmitter portion of the apparatus and applied to the control grid electrode of the squelch tube of the receiver portion of the apparatus, with the following values being given to the components shown in the drawing:

*Tubes*

| Reference No. | RMA Type |
|---|---|
| 21 | ½ 12AX7 |
| 122, 124 | 807 |
| 41, 51 | ½ 12AX7 |

*Resistors*

| Reference No. | Value | Unit |
|---|---|---|
| 47 | 1 | megohm. |
| 59 | 6.8 | megohms. |
| 138 | 270 | ohms. |
| 45 | 1 | megohms. |

*Capacitor*

| Reference No. | Value | Unit |
|---|---|---|
| 139 | 1,500 | mmfd. |

The principles of the invention are applicable to transceiver arrangements, wherein some of the components are switched from a circuit arrangement in which they are employed for transmitting to another circuit arrangement in which they are employed for receiving. Such switching is conventionally accomplished by means of a multiple two-position gang switch.

The invention claimed is:

1. In an installation of complementary electronic apparatus including a first wave translating channel including an electron discharge system having at least a cathode and a control grid arranged for continuous operation and including a first wave input circuit connected to the control grid of said electron discharge system and having an electron discharge device comprising a control element coupled to said first wave input circuit and an output element coupled to the control grid of said electron discharge system to block said electron discharge system in response to potential applied to said control element when said first wave translating channel is energized, and no input wave is applied to said input circuit, operation of said electron discharge device in the first wave translating channel normally being ineffective for a given period of time after said first wave translating channel is energized, and a second wave translating channel including an electron discharge structure having at least a cathode electrode and a control electrode arranged for selective operation with said first wave translating channel, means in series circuit with the electrodes of said electron discharge structure to produce a direct potential when said second wave translating channel is energized, connections to apply said direct potential to said electron discharge device to render the control element thereof sufficiently positive to block said electron discharge system when said second channel is energized, and means interposed in said connections to maintain said direct potential on said electron discharge device substantially for said given time period.

2. In an installation of complementary electronic apparatus including a first wave translating channel including an electron discharge system having a least a cathode and a control grid arranged for continuous operation and including a first wave input circuit connected to the control grid of said electron discharge system and having an electron discharge device comprising cathode and control elements coupled to said first wave input circuit and an anode element coupled to the control grid of said electron discharge system to block said electron discharge system in response to positive potential applied to the control element of said device when said first wave translating channel is energized and no input wave is applied to said input circuit, operation of said electron discharge device in the first wave translating channel normally being ineffective for a given period of time after said first wave translating channel is energized, and a second wave translating channel including an electron discharge structure having at least a cathode electrode and a control electrode arranged for selective operation with said first wave translating channel, means in series circuit with the electrodes of said electron discharge structure to produce a direct potential when said second wave translating channel is energized, connections to apply said direct potential to said electron discharge device to render the control element thereof sufficiently positive with respect to the cathode thereof to block said electron discharge system when said second channel is energized, and means interposed in said connections to maintain said direct potential on said electron discharge device substantially for said given time period.

3. In an installation of complementary radio apparatus, arranged for selective operation, there being an electron discharge device in one portion of said apparatus normally enabled only after a substantial time delay after energization of said portion, a circuit arrangement for rendering said electron discharge device substantially immediately operative, including means to develop a direct potential in response to activation of said other portion, means to apply said direct potential to said electron discharge device to enable the same substantially immediately upon energization of said other portion, and delay means interposed in said potential application means to maintain said electron discharge device in operating condition for a predetermined time period after said other portion is de-energized and said one portion is energized.

4. In combined radio transmitting and receiving apparatus having a radio frequency amplifier for amplifying signals to be transmitted, comprising an electron discharge electrode structure, a self-bias resistor connected to said electrode structure to produce a potential thereacross when said electrode structure is energized, and an audio frequency squelch circuit for muting the receiving apparatus in the absence of received signals, comprising an electron discharge device having control and cathode electrodes to which control currents are applied for operation of the squelch circuit, said control currents being available only after an appreciable time delay after energization of the receiving apparatus, a filter resistor connected between said control electrode of said electron discharge device and the positive potential end of said self-bias resistor, and a capacitor connected across the self-bias resistor of said electrode structure, said filter resistor and capacitor having values at which a time delay period of substantially one-tenth of a second is provided, whereby said electron discharge device will be operative for substantially said delay period immediately after de-energizing said electron discharge structure.

5. In a half duplex radio communication system including a transmitter and a receiver selectively energizable, a radio frequency amplifier stage in said transmitter for amplifying signals to be transmitted including an electron discharge structure having a cathode, a control grid and an anode, an audio frequency amplifier stage in said receiver for amplifying signal currents after detection including an electron discharge system having cathode, control and anode electrodes, a squelch circuit in said receiver including an electron discharge device having cathode, control and anode elements, said anode element being connected to the control electrode of said electron discharge system, said control element being connected to a source of noise voltage, a bias resistor connected in the cathode-anode circuit of said electron discharge structure, the end of said bias resistor remote from the cathode of said electron discharge structure being connected to a point of fixed reference potential, a capacitor shunted across said bias resistor, means including a switching element operative alternatively to apply a source of energizing potential between said point of fixed reference potential and the anode of said radio frequency amplifier and between said point and the cathode element of said electron discharge device, and a filter resistor connected in series between a point on said bias resistor and the control element of said electron discharge device, said filter resistor and said capacitor having values at which a predetermined time period is effected, whereby said electron discharge device is rendered active for said predetermined time period substantially immediately after said radio frequency amplifier is de-energized by operation of said switching element.

6. In a half duplex radio communication system including a transmitter and a receiver selectively energizable, a radio frequency amplifier stage in said transmitter for amplifying signals to be transmitted including an electron discharge structure having a cathode, a control grid and an anode, an audio frequency amplifier stage in said receiver for amplifying signal currents after detection including an electron discharge system having cathode, control and anode electrodes, a squelch circuit in said receiver including an electron discharge device having cathode, control and anode elements, said anode element being connected to the control electrode of said electron discharge system, said control element being connected to a source of noise voltage, a bias resistor connected in the cathode circuit of said electron discharge structure, the end of said bias resistor remote from the cathode of said electron discharge structure being connected to a point of fixed reference potential, a capacitor shunted across said resistor, means including a switching element operative alternatively to apply a source of energizing potential between said point of fixed reference potential and the anode of said radio frequency amplifier and between said point and the cathode element of said electron discharge device, and a filter resistor connected in series between the cathode of said electron discharge structure and the control element of said electron discharge device, said filter resistor and said capacitor having values at which a predetermined time period between one-twentieth and one-fifth of a second is effected, whereby said electron discharge device is rendered active for said predetermined time period substantially immediately after said radio frequency amplifier is de-energized by operation of said switching element.

7. In a half duplex radio communication system including a transmitter and a receiver selectively energizable, a radio frequency amplifier stage in said transmitter for amplifying signals to be transmitted including an electron discharge structure having a cathode, a control grid and an anode, an audio frequency amplifier stage in said receiver for amplifying signal currents after detection including an electron discharge system having cathode, control and anode electrodes, a squelch circuit in said receiver including an electron discharge device having cathode, control and anode elements, said anode element being connected to the control electrode of said electron discharge system, said control element being connected to a source of noise voltage, a bias resistor connected in the cathode circuit of said electron discharge structure, the end of said bias resistor remote from the cathode of said electron discharge structure being connected to a point of fixed reference potential, a capacitor shunted across said bias resistor, means including a switching element operative alternatively to apply a source of energizing potential between said point of fixed reference potential and the anode of said radio frequency amplifier and between said point and the cathode element of said electron discharge device, and a filter resistor connected in series between the cathode of said electron discharge structure and the control element of said electron discharge device, said filter resistor and said capacitor having values at which a predetermined time constant of substantially one-tenth of a second is provided, whereby said electron discharge device is rendered active for one-tenth of a second substantially immediately after said radio frequency amplifier is de-energized by operation of said switching element, after which said electron discharge device is rendered active by normal operation of said receiver.

8. In combined radio transmitting and receiving apparatus having a radio frequency amplifier for amplifying signals to be transmitted including an electron discharge structure having a cathode, a control grid and an anode, a bias resistor connected in circuit with said cathode to produce a potential thereacross when said structure is energized, and a capacitor shunted across said resistor, and an audio frequency amplifier for monitoring signals to be transmitted and for amplifying received signals after detection including an electron discharge system having cathode and grid electrodes between which signal currents are applied for amplification, and a noise reducing circuit active in the absence of received signals to block said electron discharge system including an electron discharge device having a control element and also having an output element coupled to said electron discharge system, and a filter resistor connected in series between the control element of said electron discharge device and the cathode of said electron discharge structure, said filter resistor and said capacitor having values at which a time period of substantially one-tenth of a second is effected, whereby said electron discharge device will be active for substantially one-tenth of a second substantially immediately upon de-energizing said electron discharge structure.

9. In combined radio transmitting and receiving apparatus having a radio frequency amplifier for amplifying signals to be transmitted including an electron discharge structure having a cathode, a control grid and an anode, a bias resistor connected in series with said anode and said cathode to produce a potential thereacross when said structure is energized, and an audio frequency amplifier for monitoring signals to be transmitted and for amplifying received signals after detection including an electron discharge system having cathode and grid electrodes between which signal currents are applied for amplification, and a noise reducing circuit active in the absence of received signals to block said electron discharge system including an electron discharge device having a control element and also having an output element coupled to said electron discharge system, and a resistor connected between the control element of said electron discharge device and the cathode of said electron discharge structure.

10. In combined radio transmitting and receiving apparatus having a radio frequency amplifier for amplifying signals to be transmitted including an electron discharge structure having a cathode, a control grid and an anode, a bias resistor connected in the anode-cathode circuit to produce a potential thereacross when said structure is energized, a capacitor shunted across said resistor, and an audio frequency amplifier for monitoring signals to be transmitted and for amplifying received signals after detection including an electron discharge system having cathode and grid electrodes to which signal currents are applied for amplification, and a noise reducing circuit active in the absence of said received signals to block said electron discharge system including an electron discharge device having a cathode element, a control element and also having an output element coupled to said electron discharge system, a rectifier device having a cathode and an anode to which received signal currents are applied to produce a control potential for said noise reducing circuit, and a grid resistor and a filter resistor connected in series between the cathode element of said rectifier device and the cathode of said electron discharge structure, the control element of said electron discharge device being connected to the junction between said filter and said grid resistors, said filter resistor and said capacitor having values at which a time period of substantially one-tenth of a second is effected, whereby said electron discharge device will be active for substantially one-tenth of a second substantially immediately upon de-energizing said electron discharge structure.

11. In half duplex radio station apparatus, a receiver producing an audio frequency voltage output in response to received signals and including a squelch circuit producing a voltage output in the absence of received signals, and a transmitter including means to modulate a radio frequency wave with an applied audio frequency wave, said receiver and said transmitter being arranged for selective operation, an audio frequency voltage amplifier including an audio frequency input circuit to which said audio frequency voltage output of the receiver is applied, a bias voltage input circuit to which the output of said squelch circuit is applied and an audio frequency output circuit, and an audio frequency monitor circuit arranged for continuous operation, a switching arrangement having one switching element arranged to apply an audio frequency wave simultaneously to said transmitter and to said audio frequency input circuit of said audio frequency amplifier and selectively to receive an audio frequency wave from said audio frequency output of said audio frequency amplifier and another switching element operative selectively to energize said transmitter and said receiver, means in said transmitter to derive a direct potential and to maintain the same for a predetermined time period, and means to apply said derived direct potential to said squelch circuit to enable the same for said predetermined time period substantially immediately after said transmitter is deenergized and said receiver is energized.

12. In half duplex radio station apparatus, a receiver producing an audio frequency voltage output in response to received signals and including a squelch circuit producing a voltage output in the absence of received signals, and a transmitter including means to modulate a radio frequency wave with an applied audio frequency wave, said receiver and said transmitter being arranged for selective operation, an audio frequency voltage amplifier including an audio frequency input circuit to which said audio frequency voltage output of the receiver is applied, a bias voltage input circuit to which the output of said squelch circuit is applied and an audio frequency circuit, and an audio frequency monitor amplifier circuit arranged for continuous operation, a switching arrangement having one switching element arranged to apply an audio frequency wave simultaneously to said transmitter and to said audio frequency input circuit of said audio frequency amplifier and selectively to receive an audio frequency wave from said audio frequency output of said audio frequency amplifier, another switching element operative selectively to energize said transmitter and said receiver, and a further switching element operative to ground said audio frequency voltage output and the output of said modulating means selectively, means in said transmitter to derive a direct potential and to maintain the same for a predetermined time period, and means to apply said derived direct potential to said squelch circuit to enable the same for said predetermined time period substantially immediately after said transmitter is de-energized and said receiver is energized.

13. In half duplex radio station apparatus, a receiver producing an audio frequency voltage output in response to received signals and including a squelch circuit producing a bias voltage output in response to a positive control voltage derived in the absence of received signals, said positive control voltage normally being available only after a given time delay period subsequent to energizing said receiver, and a transmitter including means to modulate a radio frequency wave with an applied audio frequency wave, said receiver and said transmitter being arranged for selective operation, an audio frequency voltage amplifier including an audio frequency input circuit to which said audio frequency voltage output of the receiver is applied, a bias voltage input circuit to which the output of said squelch circuit is applied and an audio frequency output circuit, and an audio frequency monitor amplifier circuit arranged for continuous operation, a switching arrangement having one switching element arranged to apply an audio frequency wave simultaneously to said transmitter and to said audio frequency input circuit of said audio frequency amplifier and selectively to receive an audio frequency wave from said audio frequency output of said audio frequency amplifier, another switching element operative selectively to energize said transmitter and said receiver, and a further switching element operative to ground said audio frequency voltage output and the output of said modulating means selectively, means in said transmitter to derive a positive potential and to maintain the same for a predetermined time period, and means to apply said derived positive potential to the control voltage connections of said squelch circuit to enable the same for said predetermined time period substantially immediately after said transmitter is de-energized and said receiver is energized.

14. In combined radio transmitting and receiving apparatus having a radio frequency amplifier for amplifying signals to be transmitted including an electron discharge structure having a cathode, a control grid and an anode, an impedance element connected in circuit with said electron discharge structure to produce a potential thereacross only when said structure is energized, a storage element connected to said impedance element to store said potential for a time after deenergization of said electron discharge structure, and an audio frequency amplifier for monitoring signals to be transmitted and for amplifying received signals after detection including an electron discharge system having cathode and grid electrodes between which signal currents are applied for amplification, and a noise reducing circuit active in the absence of received signals to block said electron discharge system including an electron discharge device having a control element and also having an output element coupled to said electron discharge system, and a filter element connected between the control element of said electron discharge device and the junction of said storage and said impedance elements, whereby said electron discharge device will be active substantially immediately upon deenergizing said electron discharge structure.

References Cited in the file of this patent

UNITED STATES PATENTS

| | | |
|---|---|---|
| 1,891,299 | Anderson et al. | Dec. 20, 1932 |
| 2,408,826 | Vogel | Oct. 8, 1946 |
| 2,475,578 | Halstead | July 5, 1949 |